No. 808,132. PATENTED DEC. 26, 1905.
A. E. WILLIAMS.
PILE DRIVER.
APPLICATION FILED FEB. 4, 1905.

No. 808,132. PATENTED DEC. 26, 1905.
A. E. WILLIAMS.
PILE DRIVER.
APPLICATION FILED FEB. 4, 1905.
7 SHEETS—SHEET 5.

Witnesses
Jno Imrie
W. A. Williams.

Inventor
A. E. Williams.
By J. R. Nottingham
Attorney

UNITED STATES PATENT OFFICE.

ARCHEY E. WILLIAMS, OF DOUGLAS, ARIZONA TERRITORY.

PILE-DRIVER.

No. 808,132.        Specification of Letters Patent.        Patented Dec. 26, 1905.

Application filed February 4, 1905. Serial No. 244,151.

*To all whom it may concern:*

Be it known that I, ARCHEY E. WILLIAMS, a citizen of the United States, residing at Douglas, in the county of Cochise and Territory of Arizona, have invented certain new and useful Improvements in Pile-Drivers; and I do hereby declare the following to be a full, clear, and exact description of the invention, such as will enable others skilled in the art to which it appertains to make and use the same.

This invention relates to that class of pile-drivers commonly known as the "pendulum" type, and is especially designed for use in railway-work, the pile-driver mechanism being mounted upon a flat-car capable of being moved from point to point along the railroad.

One of the principal objects of the invention is the provision of special mechanism for moving the car and the supported pile-driver mechanism over the railroad without the use of a locomotive.

Another object of the invention is to so construct the upper part of the framework that it can be readily lowered or folded, so as to permit the passage of the machine through tunnels and under bridges or other low structures.

Still another object of the invention is to produce a pile-driver mechanism of the simplest form of construction consistent with strength and effectiveness in operation and which can be used to drive piles at any required angle as well as vertically.

Other objects of the invention will become apparent upon a detailed description thereof.

The invention consists of the novel construction and arrangement of the several mechanisms and their parts, as will be hereinafter fully described in this specification and briefly stated in the claims.

In the drawings, Fig. 5, a top plan view, partly in section, of one end of the car, showing automatic means for moving the leaders from a vertical to an inclined position; Fig. 6, a detail perspective of a portion of the track which supports the upper portion of the frame as it is being lowered.

For convenience I will describe my improved pile-driver under the following heads, viz: the car and propelling mechanism, the lower framework, the upper (folding part) framework, the turn-table and operating mechanism, the leaders and their connections, mechanism for shifting the leaders from a vertical to an inclined position, mechanism for partially turning the pile-driver, and the general operation.

Similar numerals of reference indicate like parts throughout the several views.

Figures 2, 3, 17:
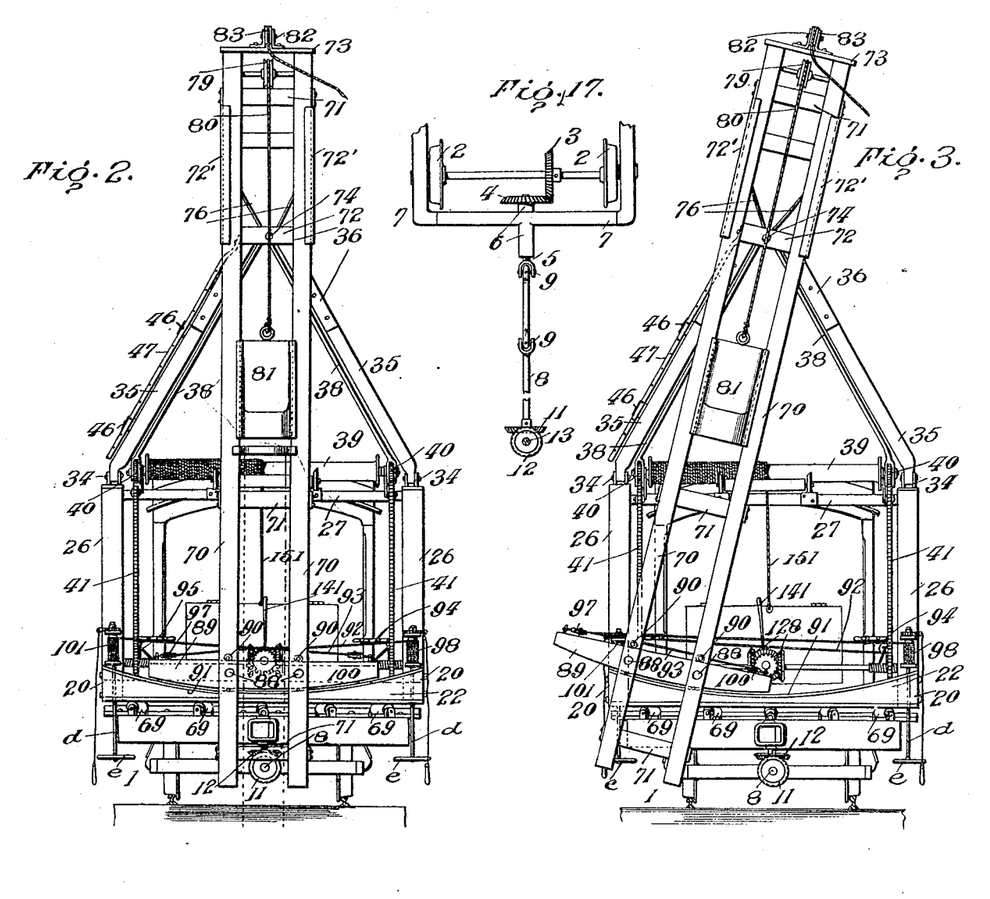
Fig. 2, a front elevation.
Fig. 3, a similar view showing the leaders inclined to one side in position to drive a pile at an angle.
Fig. 17, a detail top plan view of the mechanism for transmitting motion to the driving-wheels of the car, and Fig. 18 a perspective view of a pile-ring.

*The car and propelling mechanism.*—The numeral 1 indicates a flat-car mounted on the usual or ordinary type of trucks, except that one pair of the wheels is used as driving-wheels 2. Centrally secured on the shaft of the wheels 2 is a gear-wheel 3, which meshes with a bevel gear-wheel 4, secured on one end of a short shaft 5, mounted in bearings 6 6 on cross truck-bars 7 7, as shown in Fig. 17. The other end of the shaft 5 is connected to a shaft 8 by means of two knuckle or universal joints 9 9, which serve to accommodate for the slewing of the trucks in rounding curves. The shaft 8 is journaled in suitable bearings 10 10, secured to the queen-sills of the car, and secured on the outer end of said shaft is a bevel gear-wheel 11, meshing with a similar gear-wheel 12, secured on the end of a vertical shaft 13, journaled in suitable bearings 14 and 15. Mounted on the upper end of the vertical shaft 13 is a bevel gear-wheel 16, which meshes with a similar gear-wheel 17, secured on the main driving-shaft 18 of an engine 19. By means of this mechanism the car may be moved from point to point over a railroad by the power derived from the engine 19, thereby dispensing with the locomotive generally used for this purpose, the employment of which entails great expense and oftentimes great inconvenience in providing the same. Sufficient power may be obtained from the engine 19 to move other cars that may be coupled to the pile-driver car.

When the pile-driver is in operation, the car-propelling mechanism may be put out of use by the employment of any of the well-known friction-clutches, which will move the gear-wheel 17 out of mesh with the gear-wheel 16.

Figures 1, 14:
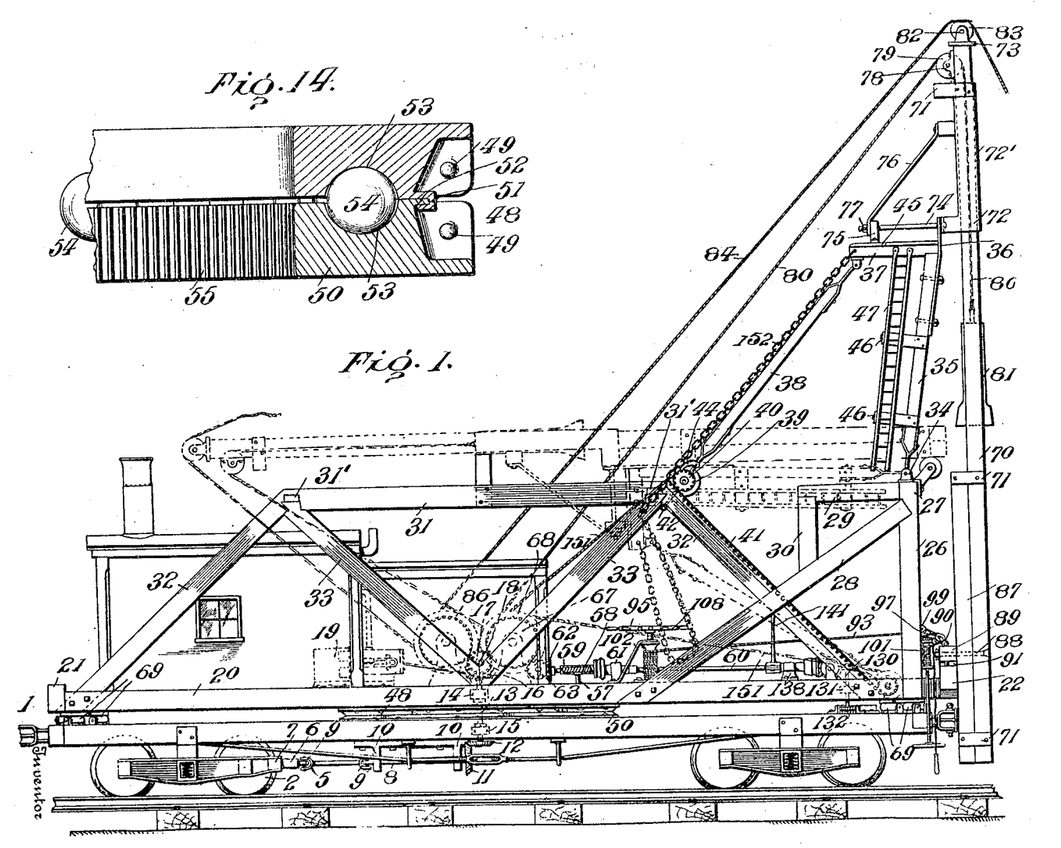
Figure 1 is a side elevation of my improved pile-driver, showing in dotted lines the upper parts in folded position.
Fig. 14, a vertical section of a portion of the track and turn-table.
Figure 4:
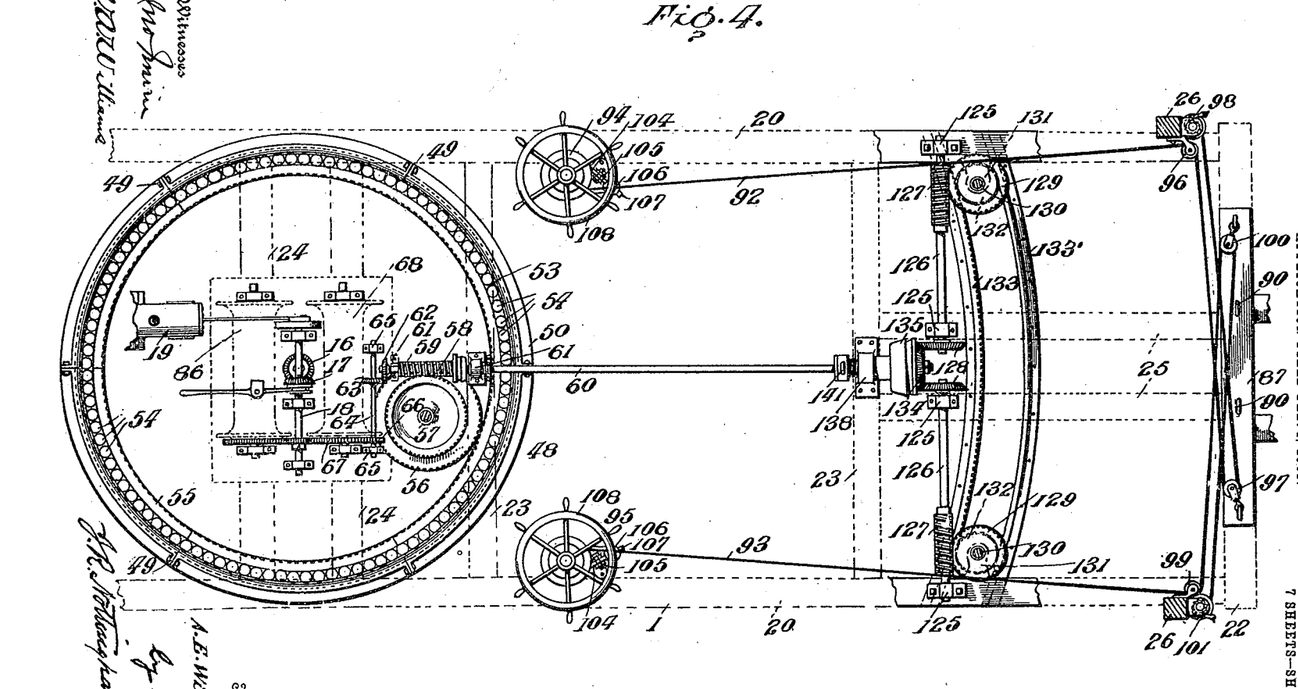
Fig. 4, a top plan view of the several mechanisms arranged upon the bottom framework or base of the pile-driver and the car-deck, a part of the framework being shown in horizontal section.
Figure 15:
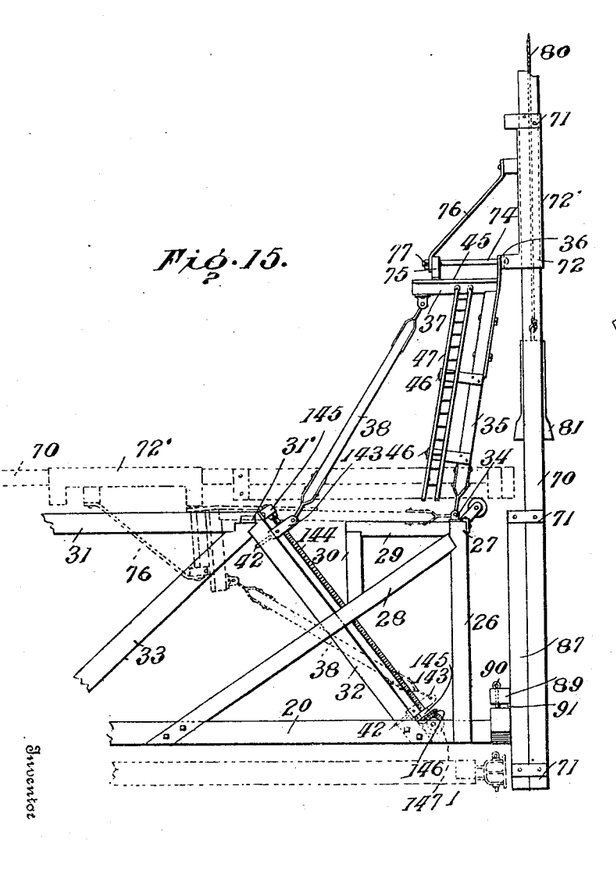
Fig. 15, a side elevation of a modified form of support and guides for raising and lowering the upper part of the structure.

*The lower framework.*—The lower frame of the pile-driver is composed of side sills 20 20, end sills 21 22, intermediate cross-sills 23 23, and engine-supporting sills 24 24, and intermediate longitudinal sills 25 25. The end sill 22 has its upper surface curved and is commonly known as the "moon-beam," and for the purpose of clearness will be hereinafter referred to as such. Secured to the side sills in any well-known manner at each forward corner are posts 26 26, as shown in Figs. 1, 4, and 15, said posts having their upper ends connected together by a cross-beam 27, as shown in Figs. 2 and 3, and suitably braced by braces 28 28, (only one being shown,) as seen in Figs. 1 and 15. Projecting rearwardly from the cross-beam 27 and secured thereto in any suitable manner is a platform 29, which has its outer or projecting side supported from the braces 28 by supports 30, as shown in Figs. 1 and 15.

The numerals 31 31 indicate side beams which are supported above the side sills by outwardly and downwardly inclined supports 32 32 and braced by inwardly and downwardly inclined braces 33 33, as shown in Figs. 1 and 15. The side beams 31 are connected together at their respective ends by cross-beams 31' 31', as shown in Fig. 1.

*The upper (folding parts) framework.*—Secured to the upper ends of the corner-posts 26 is an ear 34, to which is pivoted the "stiff-legs" 35. The upper ends of the stiff-legs are connected together by a crown-yoke 36, and projecting rearwardly from said stiff-legs are arms 37 37, to which are pivoted strain-braces 38. Journaled in the free ends of the strain-braces is a drum or roller 39, and secured on each end of the drum-shaft is a gear-wheel 40, which meshes with the teeth of a rack-bar 41, secured upon the upper edge of the forward inclined support 32, as shown in Figs. 1, 2, and 3. Each gear-wheel 40 is held in engagement with its rack-bar by means of a hook or latch 42. To prevent the gear-wheels 40 from accidentally slipping down the inclined rack-bars, the drum-shaft is locked against rotating by means of a pawl or dog 44, pivoted on the strain-brace and engaging the teeth of the gear-wheels 40. When the pawl is in engagement with the gear-wheels, the drum cannot revolve.

Supported upon the arms 37 is a platform 45, and attached to said arms and to yokes 46 46 is a ladder 47, which leads down to the platform 29.

*The turn-table and operating mechanism.*—The frame of the pile-driver is mounted upon a turn-table or carriage 48, preferably made in sections and bolted together at their respective ends, as shown at 49, Figs. 4 and 14. The turn-table, which is also preferably made in sections and bolted together, is arranged to revolve upon a circular track 50 and is connected to the track by hooks 51, which engage lips 52, projecting from the upper face of the track, as shown in said Fig. 14. The adjacent faces of the turn-table and track are provided with an annular groove 53, which forms a race for the bearing-balls 54. The inner periphery of the track is provided with teeth 55, and meshing with said teeth is a gear-wheel 56, mounted on a vertical shaft 57, as shown in Fig. 4. Slidably secured by a key on the upper end of the shaft 57 is a second gear-wheel 58, which meshes with a worm-screw 59, secured on the shaft 60, said shaft being journaled in bearings 61 61 61, as seen in said Fig. 4. The shaft 60 is provided at its rear end with a bevel gear-wheel 62, which meshes with a similar gear-wheel 63, secured on a horizontal shaft 64, journaled in suitable supports 65 65. Also secured on the shaft 64 is a gear-wheel 66, which meshes with a gear-wheel 67, secured on the shaft of a drum 68. Motion being transmitted to the shaft 64 from the drum-shaft, the shaft 60 will be caused to revolve through the medium of gear-wheels 62 and 63 and transmit motion to the vertical shaft 57 through the medium of the worm-gear, and thereby revolve the turn-table and the pile-driver mechanism supported thereupon, the respective ends of the frame being supported by the rollers 69, secured to the deck of the car.

Figure 9:
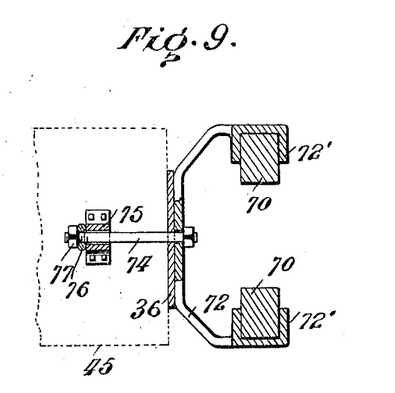
Fig. 9, a detail top plan view of the crown-yoke to which the leaders are pivoted.

*The leaders and their connections.*—The numerals 70 70 indicate the leaders, which are connected together at suitable distances apart by yokes 71 71 71 72 and head-block 73. The leaders are pivoted to the crown-yoke by a bolt 74, which passes through the yoke 72, and a perforated lug 75, secured to the platform 45. The yoke 72 is formed with an extension 72', which forms a guide through which the leaders may slide when they are folded over upon the lower framework and drawn back, as shown in Figs. 1 and 9. The upper ends of the leaders are braced by a rod 76, which has its upper end secured to the guide 72' and its lower end secured on the bolt 74, a nut 77 being used to secure the parts together. Journaled in bearings 78 78, secured to the rear edge of the leaders, is a pulley 79, over which runs a cable or line 80, to one end of which is secured the hammer or monkey 81, the other end of the cable being secured to the drum 68, which is of ordinary construction and is driven by the engine in the usual manner. Journaled in suitable bearings 82, secured on the head-block 73, is a pulley 83, over which runs a cable or line 84, to be used for hoisting piles into position and for lowering the upper parts of the frame. One end of the line is secured to a drum 86, similar to drum 68, and also driven by the engine. The other end of the cable is secured to the pile to be hoisted into position when piles are to be driven; but when the upper parts are to be folded the said end of the cable is to be fastened to the leaders.

*Mechanism for shifting the leaders from a vertical to an inclined position.*—Bolted to the inner face of each leader is a furring-block 87, and detachably secured to each furring-block by means of a bolt 88 is a moon's end block 89, the lower face of which is curved to correspond with the upper face of the moon-beam 22. The lower end of the leaders are prevented from swinging outward by means of pins 90, which pass through holes in the moon's end block and engage the rear edge of the plate 91, secured to the moon-beam.

Figure 7:
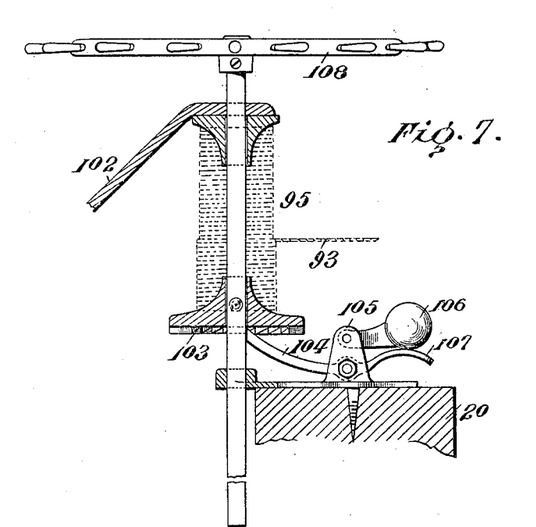
Fig. 7, a vertical section of one of the windlasses or winches on which one of the cables or lines is wound and the pawl-engaging mechanism, the latter being shown in full lines.
Figure 8:
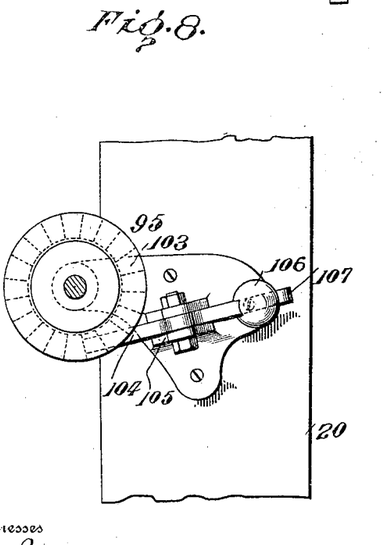
Fig. 8, a top plan view of the pawl-engaging mechanism.

The leaders are shifted from a vertical to an inclined position to either side by means of cables or lines 92 and 93 and winches or windlasses 94 and 95. One end of the cable 92 is attached to the winch 94 and passing through pulley-blocks 96 and 97 has its other end fastened to one of the corner-posts, as shown at 98, Fig. 4. One end of the cable 93 is secured to winch 95 and passing through pulley-blocks 99 and 100 has its other end fastened to the opposite corner-post, as shown at 101, same figure. The shaft of each winch has its lower end journaled in the side sill of the lower frame and its upper end in a brace 102, secured to said side sill. The bottom of each winch is provided with ratchet-teeth 103, and a pawl 104 is adapted to engage said teeth to hold the winch at rest when desired. Each pawl is pivoted to a standard 105, secured to a side sill, and is normally held in engagement with the ratchet-teeth by a pivoted weight 106, resting upon an arm 107 of the pawl, as shown in Figs. 7 and 8. In turning the winch to wind the cable it will be evident that the pawl will slip over the ratchet-teeth. The winches are operated by hand-wheels 108.

Figures 5, 6, 18:
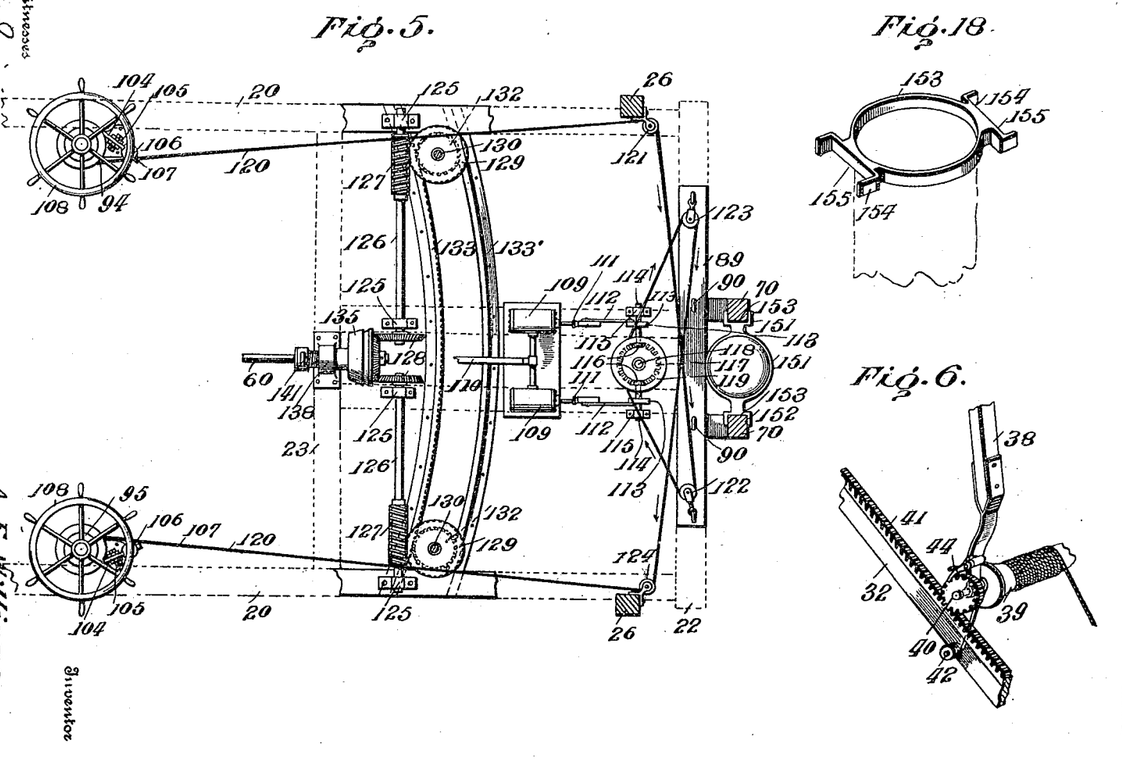

In Fig. 5 I have shown another means (automatic) for shifting the leaders from a vertical to an inclined position. The numeral 109 indicates a small engine receiving steam from the boiler of the engine 19 through pipe 110. The pistons of engine 109 are provided with cross-heads 111, to which are attached connecting-rods 112. The outer ends of the connecting-rods are attached to crank-disks 113 on short shafts 114, which have their outer ends journaled in bearings 115 and their inner ends in suitable bearings (not shown) secured on the intermediate longitudinal beams of the frame. Mounted on the inner end of each shaft 114 is a beveled gear-wheel 116, which meshes with a gear-wheel 117, secured on a vertical shaft 118, carrying a drum 119. Running from the winch 94 is a cable or line 120, which passes through pulley-blocks 121 and 122, thence around the drum 119 with several turns or wraps, thence through pulley-blocks 123 and 124 to the winch 95, where it is fastened. The shafts 114 being driven by the engine 109 will cause the drum 119 to revolve and wind up the cable at one side and unwind it at the opposite side. The winding of the cable will shift the leaders from their normal or vertical position to an inclined position as the pulley-blocks 122 and 123 are secured to the moon's end block of the leaders. The engine 109 is of a type which can be reversed at will, so that the shafts 114 may be rotated in either direction.

Figures 10, 11, 12, 13:
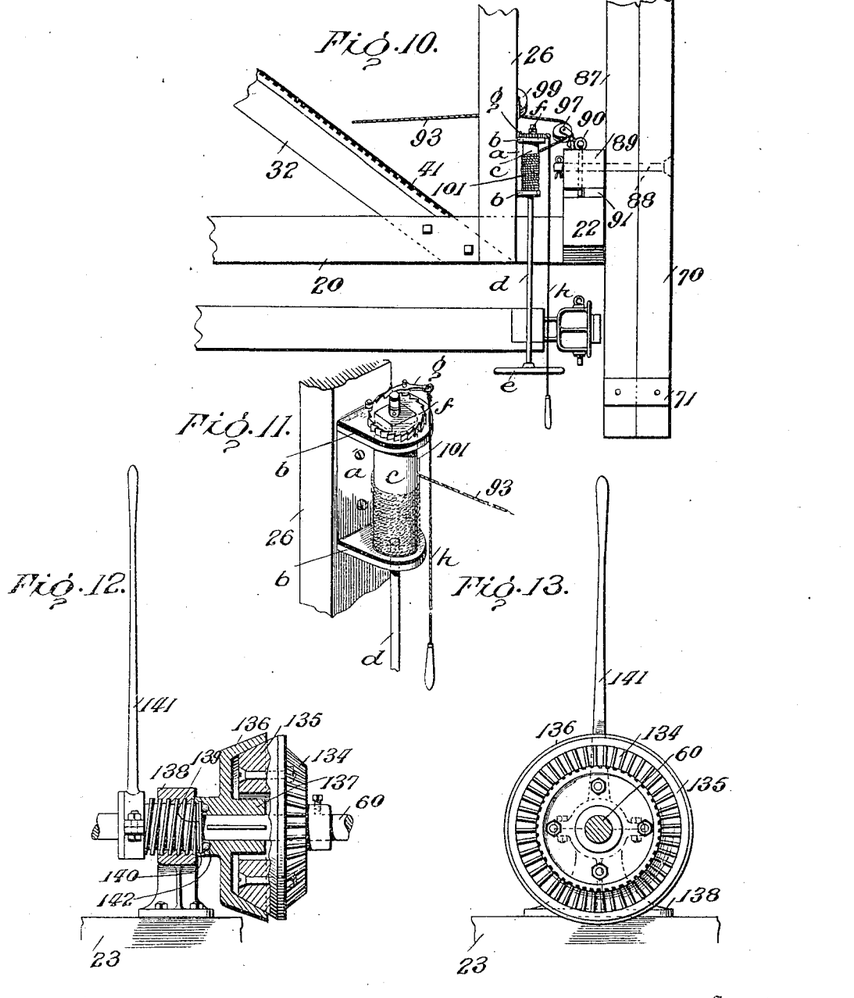
Fig. 10, a side elevation of a modified form of the mechanism for shifting the leaders to an inclined position.
Fig. 11, a perspective view, somewhat enlarged, of the drum and ratchet composing said mechanism.
Fig. 12, a longitudinal section of the friction-clutch for connecting and disconnecting the mechanism for partially turning the pile-driver.
Fig. 13, a front elevation of the same.

In Figs. 10 and 11 I have shown still another form of mechanism for shifting the leaders, which can be operated by a person standing on the ground. Secured to the front face of each corner-post 26 is a bracket $a$, having arms $b$ $b$, in which is mounted a rotatable drum $c$, the upper end being journaled in the upper arm and the lower end being provided with a shaft $d$ of less diameter than the drum journaled in the lower arm. The end of the shaft $d$ is provided with a detachable hand-wheel $e$, by means of which the drum may be operated. The upper end of the drum projects above the arm of the bracket and is squared to receive a ratchet-wheel $f$, and a pivoted spring-pressed pawl $g$, operated by a cord $h$, is arranged to engage the ratchet-wheel and hold the drum against rotation. The ends of cables 92 and 93 instead of being fastened to corner-posts 26 26 are made fast to drums $c$, so that by "slacking off" on one drum and winding up on the other the leaders may be shifted from a vertical to an inclined position. When it is desired to swing the pile-driver to one side or the other of the car, the cables are detached from the drums $c$, the operating-wheels $e$ from the shafts $d$, and the drums raised from their bearings in the arms $b$ a sufficient distance to allow the ends of shafts $d$ to clear the car. This is readily accomplished because the bearing in the upper arm is of the same diameter as the drum.

*Mechanism for partially turning the pile-driver.*—Mounted in suitable bearings 125 125 125 125, secured upon the side sills and intermediate longitudinal sills, are two shafts 126 126, each carrying at one end a worm-screw 127 and at the other end a beveled gear-wheel 128, as shown in Fig. 5. The worm-screws are adapted to mesh with gear-wheels 129 129, mounted on vertical shafts 130 130, journaled in bearings 131 131, secured to the side sills, as shown in Figs. 1 and 4. Secured on the lower end of each shaft 130 is a spur gear-wheel 132, and secured to the deck of the car are two curved rails 133 133', as shown in Figs. 4 and 5, one of which is provided with teeth, the other rail serving as a guide-rail. The spur-wheels mesh with the teeth of the rail 133, so that when motion is imparted to said spur-wheels (in one direction) the pile-driver will be partially turned to one side, and when a reverse motion is imparted to said spur-wheels the pile-driver will be turned to the opposite side.

Secured on the forward end of the shaft 60 is a bevel gear-wheel 134, and bolted to the rear face of said gear-wheel is a friction block or head 135, preferably made in sections, having a beveled periphery, as shown in Fig. 12. Movable longitudinally on the shaft 60 is a flanged disk 136, said disk having the inner surface of its flange beveled to correspond with the beveled periphery of the friction-block. Slidably mounted on said shaft 60 is a sleeve 137, which is externally threaded to be screwed into an internally-screw-threaded bearing 138, secured on one of the cross-sills of the frame. The inner end of the sleeve 137 is provided with a groove 139, into which sits the ends of hooks or latches 140 140, secured to the hub of the flanged disk to connect said sleeve with said disk. The outer end of the sleeve is provided with a lever 141, by means of which the sleeve may be turned in its bearing to disengage the disk from the gear-wheel 134, so as to put the shafts 126 out of operation. The face end of the hub of the flanged disk is provided with a ball-race 142, in which balls are placed to prevent friction between the ends of the disk-hub and the sleeve when said sleeve is forced against the flanged disk to make frictional contact with the gear-wheel 134.

It will be evident that when shaft 60 is revolved motion will be transmitted to shafts 126 through the medium of gear-wheels 134 and 128 and thence to the vertical shafts 130 through worm-gears 127 129. The spur-wheels 132 engage the teeth of the rail and cause the partial rotation of the turn-table in either direction, according to the direction of revolution of the shaft 60. Thus it will be seen that the leaders may be positioned to either side of the car, the limit of distance being governed by the length of the rails engaged by the spur-wheels. When, however, it is desired to continue the movement to position the leaders farther to the side, the flanged disk 136 is thrown out of frictional contact with the gear-wheel 134 and the mechanism for revolving the turn-table is employed.

The general operation of my improved pile-driver mechanism will be readily understood from the description herein set forth without further explanation other than to state that when it is desired to lower the folding parts the bolts 88 and pins 89 are withdrawn to disconnect the leaders from the moon's end block and the pawl 44 disengaged from the ratchet-wheel 43. The end of the pile cable or line 84 is made fast to one of the lower yokes 71, and by slacking the cable 80 and winding up the pile-cable the parts may be folded, as shown in dotted lines in Fig. 1. After the parts have been lowered a further winding up of the pile-cable draws the leaders back until the lower end of said leaders are approximately even with the front of the framework and car.

Figure 16:
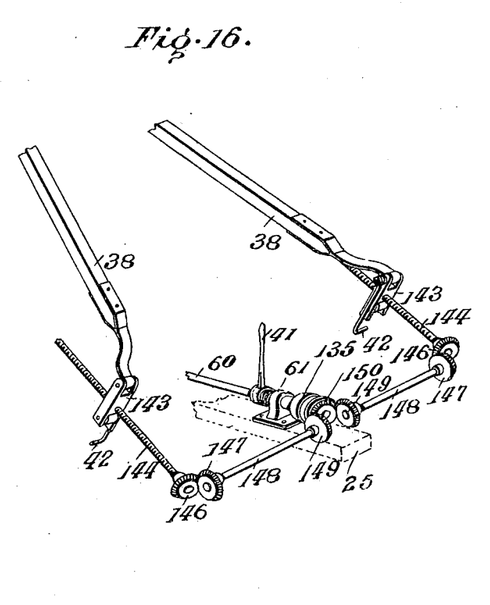
Fig. 16, a perspective view of a portion of the same.

In Figs. 15 and 16 I have shown a modified form of mechanism for supporting and guiding the folding parts of the framework. The free ends of the strain-braces 38 are provided with pivoted screw-threaded nuts 143 143, which are adapted to run on screw-threaded rods 144 144. The screw-threaded rods are supported in bearings 145 145 and have secured on their lower ends bevel gear-wheels 146 146, meshing with similar gear-wheels 147 147, mounted on transverse shafts 148 148. Secured on the inner ends of the shafts 148 are bevel gear-wheels 149 149, which mesh with a bevel gear-wheel 150, secured on an extended end of shaft 60. As the shaft 60 is revolved power will be transmitted to shafts 148 and thence to the screw-threaded rods 144 through the medium of gear-wheels 146 147. As the rods 144 revolve the nuts 143 will be fed down said rods, and thereby cause the upper parts of the framework to be lowered or folded, as shown in dotted lines, Fig. 15.

In raising the leads from their lowered or folded position to their normal or vertical position I secure one end of a cable 151 to the drum 68 and the other end of said cable to the roller 39, Figs. 1, 2, and 3, so that by rotating the drum 68 the cable will be wound up and the stiff legs returned to their normal position, and consequently the leaders.

In order to prevent the upper ends of the leaders from tilting forward, I secure one end of a chain 152 to one of the platform-arms 37 and the other end to one of the side supports 33, as shown in Fig. 1.

In Fig. 18 I have illustrated a pile-ring 153, which is adapted to fit over the upper end of the pile to prevent splintering while the pile is being driven. The pile-ring is preferably made in one piece and provided with oppositely-disposed outwardly-extending arms 154 154, forming guideways 155 155, adapted to engage the sides of the leaders, as shown in said figure. The ring forms a band around the end of the pile and prevents it from becoming splintered during the driving operation. The pile projects through the ring, and is therefore always exposed to the blow of the hammer or monkey.

If desired, the drums on which the cables are wound and the mechanism for driving the car may be provided with a housing 156.

Having thus fully described my invention, what I claim as new, and desire to secure by Letters Patent, is—

1. In a pile-driver, the combination with the axle of one set of truck-wheels, and a gear-wheel secured on said axle, of a horizontal axle carrying a gear-wheel meshing with the gear-wheel on the axle, a second horizontal shaft carrying a gear-wheel at one end, a knuckle or universal connection between said shafts, a vertical shaft carrying on its lower end a gear-wheel meshing with the gear-wheel on the second horizontal shaft, and on its upper end a gear-wheel meshing with a gear-wheel on the main driving-shaft, the main driving-shaft, and means for driving said main shaft.

2. In a pile-driver, the combination with a car, of a circular track secured thereon, said track being provided with teeth on its inner periphery, a turn-table mounted upon the track, a gear-wheel secured on a vertical shaft and meshing with the teeth of the track, a worm-gear for driving the vertical shaft, and means for driving the worm-gear, to revolve the turn-table.

3. In a pile-driver, the combination with the car, of a circular track secured thereon, said track being provided with teeth, a gear-wheel secured on a vertical shaft and meshing with said teeth, a turn-table mounted upon the track, a horizontally-supported shaft carrying a worm-screw, a gear-wheel secured on the upper end of the vertical shaft and meshing with the worm-screw, and means for revolving the horizontal shaft, to rotate the gear-wheels on the vertical shaft and thereby the turn-table.

4. In a pile-driver, the combination with the car, of a circular track secured thereon, said track being provided with teeth, a gear-wheel secured on the lower end of a vertical shaft and meshing with said teeth, a turn-table mounted upon the track, a horizontally-supported shaft carrying a worm-screw, a gear-wheel secured on the upper end of the vertical shaft and meshing with the worm-screw, a bevel gear-wheel secured on outer end of the horizontal shaft, a drum-shaft carrying a gear-wheel, and a transverse shaft carrying a bevel gear-wheel meshing with the gear-wheel on the horizontal shaft and a gear-wheel meshing with the gear-wheel on the drum-shaft, whereby motion is imparted to the horizontal shaft.

5. In a pile-driver, the combination with the car, of a circular track secured thereon, said track being provided with teeth on its inner periphery, a turn-table mounted upon the track and connected thereto, a vertical shaft carrying at its lower end a gear-wheel meshing with the teeth of the track, a gear-wheel secured on the upper end of the vertical shaft, a horizontal shaft carrying a worm-screw meshing with the gear-wheel on the upper end of the vertical shaft, and means for revolving the horizontal shaft to transmit power to the vertical shaft.

6. In a pile-driver, the combination with the lower framework, of stiff legs pivoted to the upper ends of the corner-posts, leaders pivoted to the stiff legs, strain-braces pivoted to said stiff legs, inclined guideways, means carried by the strain-braces for causing the lower ends of said strain-braces to ride down the guideways, and means for lowering the stiff legs and leaders.

7. In a pile-driver, the combination with the lower framework, of stiff legs pivoted to the upper ends of the corner-posts, leaders pivoted to the stiff legs, inclined toothed guideways, strain-braces pivoted to said stiff legs and carrying gear-wheels meshing with the toothed guideways, and means for lowering the stiff legs and leaders.

8. In a pile-driver, the combination with the lower framework, of stiff legs pivoted to the upper ends of the corner-posts, leaders pivoted to the stiff legs, inclined toothed guideways, strain-braces pivoted to said stiff legs and carrying at their lower ends gear-wheels meshing with the toothed guideways, means for locking the gear-wheels against rotation, and means for lowering the stiff legs and leaders.

9. In a pile-driver, the combination with the lower framework, of stiff legs pivoted to the upper ends of the corner-posts, a crown-yoke secured to the upper end of the stiff legs, leaders pivoted to the crown-yoke, inclined toothed guideways secured to the lower framework, strain-braces pivoted to said stiff legs and carrying gear-wheels meshing with the toothed guideways, and means for lowering the stiff legs and leaders.

10. In a pile-driver, the combination with the lower framework, of stiff legs pivoted to the corner-posts, a crown-yoke secured to the upper ends of the stiff legs, leaders provided with a connecting-yoke having extended guideways, a pivotal connection between the crown-yoke of the stiff legs and the connecting-yoke of the leaders, inclined guideways, strain-braces pivoted to the stiff legs, means carried by the strain-braces for causing the lower ends of said strain-braces to ride down the inclined guideways, and means for lowering the stiff legs and leaders.

11. In a pile-driver, the combination with a car, of a revoluble framework mounted thereon, stiff legs pivoted to the corner-posts, leaders pivoted to the stiff legs, toothed guideways secured to the sides of the frame, pivoted strain-braces carrying gear-wheels meshing with the toothed guideways, a moon-beam secured to the front of the lower framework, a moon's end block attached to the leaders and guided by the moon-beam, and means for shifting the leaders.

12. In a pile-driver, the combination with a car, of a revoluble framework mounted thereon, stiff legs pivoted to the corner-posts, leaders pivoted to the stiff legs, inclined guideways, pivoted strain-braces carrying devices adapted to engage and move on said guideways, a moon-beam secured to the lower frame, a moon's end block detachably secured to the leaders and guided by the moon-beam, and means for shifting the leaders.

13. In a pile-driver, the combination with a car, of a revoluble framework mounted thereon, stiff legs pivoted to the corner-posts, leaders pivoted to the stiff legs, inclined guideways, pivoted strain-braces carrying devices adapted to engage and move on said guideways, a moon-beam secured to the lower framework, a moon's end block detachably secured to the leaders, a ratchet-and-pawl-controlled drum detachably secured to each corner-post, a winch secured at each side of the lower framework, a cable running from one drum, through a set of pulley-blocks, to one winch, a cable running from the other drum, through a second set of pulleys, to the other winch, whereby either the drums or the winches may be operated to shift the leaders.

14. The combination with a car, of a revoluble pile-driver mounted thereon, a curved toothed rail secured to the car-deck, spur-wheels meshing with the toothed rail, means for driving the spur-wheels in either direction to turn the pile-driver to one side or the other, and a clutch mechanism for throwing said means out of operation.

15. The combination with a car, of a revoluble pile-driver mounted thereon, a curved toothed rail secured to the car-deck, spur-wheels meshing with the toothed rail, means for driving the spur-wheels in either direction to turn the pile-driver to either side of the car, a clutch mechanism for throwing said means out of operation, and means for shifting the leaders from a vertical to an inclined position.

16. The combination with a car, of a revoluble pile-driver mounted thereon, a curved toothed rail secured to the car-deck, spur-wheels meshing with the toothed rail, a worm-gear for driving each spur-wheel, and means for driving the worm-gears to partially revolve the pile-driver to either side.

17. The combination with a car, of a revoluble pile-driver mounted thereon, a curved toothed rail secured to the car-deck, a spur-wheel meshing with the toothed rail, a worm-gear for driving each spur-wheel, means for driving the worm-gears, and a clutch mechanism for throwing said means out of operation.

18. The combination with a car, of a revoluble pile-driver mounted thereon, a curved toothed rail secured to the car-deck, spur-wheels meshing with the toothed rail, worm-gears for driving the spur-wheels, bevel gear-wheels secured on the free ends of the worm-screw shafts, a horizontal shaft carrying a bevel gear-wheel meshing with the bevel gear-wheels on the shaft of the worm-screws, and means for driving the horizontal shaft.

19. In a pile-driver, the combination with the leaders thereof, of a pile-ring having oppositely-disposed arms integral therewith, said arms being provided with guideways adapted to engage the inner faces and side of said leaders.

In testimony whereof I affix my signature in the presence of two witnesses.

ARCHEY E. WILLIAMS.

Witnesses:
J. R. NOTTINGHAM,
H. L. FRANC.